UNITED STATES PATENT OFFICE.

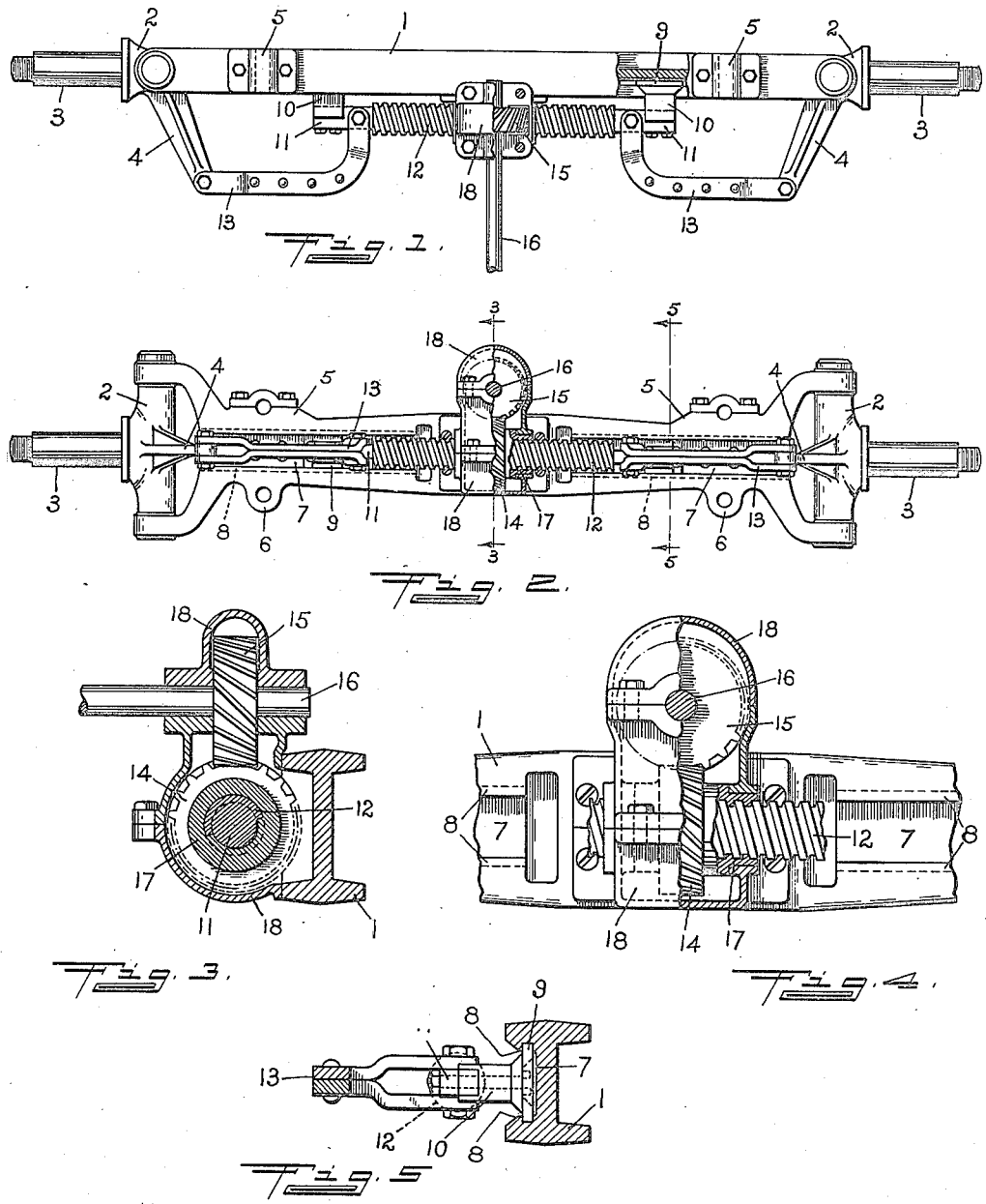

ZERN NIELSEN, OF OMAHA, NEBRASKA.

STEERING DEVICE FOR AUTOMOBILES.

1,222,238.

Specification of Letters Patent.

Patented Apr. 10, 1917.

Application filed October 12, 1916. Serial No. 125,149.

*To all whom it may concern:*

Be it known that I, ZERN NIELSEN, a citizen of the United States, residing in the city of Omaha, county of Douglas, and State of Nebraska, have invented certain new and useful Improvements in Steering Devices for Automobiles, and have described the same in the following specification, illustrated by the accompanying drawings.

My invention relates to that common class of steering devices which individually comprise a pair of steering knuckles, formed in the dead axle of an automobile, and operated in unison to steer the bearing wheels of that axle. My improved steering device is applicable with special advantage to tractors and other self-moving structures of heavy build. It is the object of the invention to facilitate and insure the steering of such tractors and other vehicles over obstacles, and on uneven ground; to steady the bearing wheels of the front axle; to steer these wheels in unison independently of each other; to diminish the friction and internal resistance of the mechanism; and in general to produce a superior steering device of the specified class. To accomplish these results, I incorporate in my improved steering device, as parts thereof, a pair of sliding guides carried by the axle, a worm-threaded distance bar connecting the guides, a pair of links connecting the distance bar with the steering arms respectively, and a stationary worm gear mounted on the axle and meshing with the worm-thread of the distance bar.

In the accompanying drawings, illustrating the best manner in which I have contemplated applying the principles of the invention, Figure 1 is a plan of a front axle and associated steering device which are constructed in accordance with the principles of my invention. Fig. 2 is a rear elevation of the same. In these Figs. 1 and 2, the device is slightly mutilated to exhibit its internal construction. Fig. 3 is a vertical section on the section line 3—3 in Fig. 2. Fig. 4 is an enlargement of a middle portion of Fig. 2. Fig. 5 is a vertical section on the section line 5—5 in Fig. 2.

In the illustrated specimen of the invention, the front axle 1 is a one-piece crossbar, resembling an I beam and provided in the usual manner with the terminal knuckles 2, which carry the wheel spindles 3 and the knuckle arms 4. Incidentally it is provided with spring seats 5 above and radius-rod brackets 6 below. It has in its back side the straight, longitudinal channel 7, which is interrupted or discontinuous in the middle and is of uniform cross section, wide at its inner end and narrowed at a little distance from that end by the upper and lower reëntrant shoulders 8, shown in Figs. 4 and 5. In each of the two separated portions of this channel is seated and permanently retained the broad head 9 of one of the two duplicate sliding guide blocks 10, which project from the channel and are spaced apart and rigidly interconnected by the externally worm-threaded bar 12. These guide blocks individually resemble in form a short T beam, whose flanges form the head 9 and whose web is the body of the block. These flanges should exceed in length the depth of the web, in order to prevent the head from binding in the channel. This longitudinally movable but nonrotatable bar, being thus mounted in parallelism with the axle bar 1, is terminally connected with the free ends of the knuckle arms 4 by connecting-rods, or links, 13 respectively. By its worm threads it meshes with the encircling worm gear 14; while the latter, being provided with external spiral teeth, meshes with the gear 15 on the spindle 16 of a steering-wheel operated by hand. The sleeve extension or hub, 17, of the gear 14 is journaled in the opposite side walls of the oil-containing housing 18 which is bolted to the middle of the bar 1; and the spindle 15, in the front and rear walls of the same.

Operatively the distance bar 11, carried by the sliding guides 10, and actuated by the spindle of the hand-wheel through the intermediate gearing, constantly and easily vibrates and controls the knuckle arms by means of the connecting links 13.

I claim as my invention—

1. A steering device of the specified class, comprising a channeled axle having steering-knuckle arms; a pair of sliding guides seated in the axle; a distance bar connecting the guides; links connecting the bar with the arms; and means for moving the distance bar endwise.

2. A steering device of the specified class, comprising a longitudinally channeled axle, provided with steering knuckles having arms; a pair of slidable guide blocks retentively seated in the axle channel; a distance bar rigidly connecting the blocks; a pair of links between the distance bar and the knuckle arms respectively; a worm thread on the distance bar; a worm gear mounted in a fixed position on the axle and meshing with the worm thread; and manually operable means for rotating the worm gear.

3. A steering device of the specified class, comprising a bar axle provided with steering knuckles having arms; a pair of sliding guides carried by the axle; a distance bar connecting the guides; links between the distance bar and the arms; and gearing for moving the distance bar endwise.

4. A steering device of the specified class, comprising a bar axle provided with steering knuckles having arms; a pair of sliding guide blocks mounted on the axle; a distance bar connecting the guide blocks and provided with a worm thread; gearing for moving the connecting bar endwise; and a pair of links between the distance bar and the knuckle arms respectively.

5. A steering device of the specified class, comprising a bar axle provided with steering knuckles having arms; a pair of sliding guides carried by the axle; a distance bar carried by the guides; gearing for moving the distance bar endwise; and link connections between the distance rod and the free ends of the knuckle arms.

6. A steering device of the specified class, comprising a longitudinally channeled bar axle provided with steering knuckles having arms; a pair of flanged guides slidably seated in the axle; a distance bar carried by the guides; means for reciprocating the distance bar endwise; and connecting-rods between the distance bar and the knuckle arms respectively.

7. A steering device of the specified class, comprising a bar axle provided with steering knuckles having arms; a pair of sliding guides carried by the axle; a worm-threaded distance bar connecting the guides; connecting-rods between the distance bar and the knuckle arms respectively; an oil chamber affixed to the axle bar; and gearing journaled in the oil chamber for reciprocating the distance bar endwise therein.

Witness my signature at Omaha, Nebraska, October 7th, 1916.

ZERN NIELSEN.